(12) United States Patent
Teal et al.

(10) Patent No.: US 7,398,389 B2
(45) Date of Patent: Jul. 8, 2008

(54) KERNEL-BASED NETWORK SECURITY INFRASTRUCTURE

(75) Inventors: Daniel M. Teal, Austin, TX (US); Richard S. Teal, Media, PA (US)

(73) Assignee: Coretrace Corporation, Austin, TX (US)

( * ) Notice: Subject to any disclaimer, the term of this patent is extended or adjusted under 35 U.S.C. 154(b) by 811 days.

(21) Appl. No.: 10/294,268

(22) Filed: Nov. 14, 2002

(65) Prior Publication Data

US 2003/0120935 A1 Jun. 26, 2003

Related U.S. Application Data

(60) Provisional application No. 60/343,098, filed on Dec. 20, 2001.

(51) Int. Cl.
*H04L 9/00* (2006.01)
(52) U.S. Cl. .................... 713/164; 713/165; 713/166; 713/167; 713/189; 713/193; 726/22; 726/23; 726/26; 726/27; 726/30
(58) Field of Classification Search ......... 713/164–167, 713/189, 193; 726/22–24, 26, 27, 30
See application file for complete search history.

(56) References Cited

U.S. PATENT DOCUMENTS

| 5,557,742 | A  |   | 9/1996  | Smaha et al. ............. 395/186 |
|-----------|----|---|---------|-----------------------------------|
| 6,070,198 | A  | * | 5/2000  | Krause et al. ............ 719/321 |
| 6,330,670 | B1 |   | 12/2001 | England et al. ............. 713/2 |
| 6,658,571 | B1 | * | 12/2003 | O'Brien et al. ............ 726/26 |
| 6,735,703 | B1 | * | 5/2004  | Kilpatrick et al. ......... 726/23 |
| 6,823,460 | B1 | * | 11/2004 | Hollander et al. ........... 726/3 |
| 6,836,888 | B1 | * | 12/2004 | Basu et al. ............... 718/104 |
| 6,851,061 | B1 | * | 2/2005  | Holland et al. ............ 726/23 |
| 2001/0044904 | A1 | * | 11/2001 | Berg et al. .............. 713/201 |
| 2001/0044905 | A1 | * | 11/2001 | Novak et al. ............. 713/201 |
| 2003/0204632 | A1 |   | 10/2003 | Willebeek-LeMair et al. |
| 2003/0204728 | A1 |   | 10/2003 | Irwin |
| 2004/0030776 | A1 |   | 2/2004  | Cantrell et al. |

(Continued)

FOREIGN PATENT DOCUMENTS

WO WO-2004/015586 2/2004

(Continued)

OTHER PUBLICATIONS http://138pc222.sshunet.nl/honeypot/extra/expl_lkm.html ("Exploiting Loadable Kernel Modules" by Michael Reiter.

(Continued)

*Primary Examiner*—Kimyen Vu
*Assistant Examiner*—Beemnet W Dada
(74) *Attorney, Agent, or Firm*—Winstead PC

(57) ABSTRACT

A system and method for network security using a kernel based network security infrastructure is disclosed. The method comprises the installation of a computer code set into the operating system kernel of each computer on a network and use of the computer code set to detect and stop unwanted or malicious intrusions into the kernel. Because the security feature is kernel based, a broader range of security features, such as security of communication between user-space applications and the kernel, can be implemented.

54 Claims, 3 Drawing Sheets

U.S. PATENT DOCUMENTS

2004/0093513 A1    5/2004    Cantrell et al.
2004/0151382 A1    8/2004    Stellenberg et al.

FOREIGN PATENT DOCUMENTS

WO    WO-2004/045126    5/2004
WO    WO-2004/070575    8/2004

OTHER PUBLICATIONS http://www.sans.org/rr/linux/kernel_mods.php ("A Review of Loadable Kernel Modules" by Andrew R. Jones, Jun. 12, 2001).

http://www.sans.org/rr/threats/rootkits.php ("Kernel Rootkits" by Dino Dai Zovi, Jul. 4, 2001).

"Your 802.11 Wireless Network Has No Clothes" by William A. Arbaugh, Narendar, Shankar, Y.C. Justin Wan—Department of Computer Science, University of Maryland, Mar. 30, 2001).

"(Nearly) Complete Linux Loadable Kernel Modules" by Pragmatic/THC, version 1.0 released Mar. 1999.

"Importance of Change Detection, A Manager's Perspective" by Pedestal Software, LLC.

"LIDS Hacking HOWTO" by Xie Huagang, Linux Intrusion Detection System, Mar. 29, 2000.

"Loadable Kernel Integrity Tools" by Eric Brandwine and Todd MacDermid (Presentation).

"A New Approach to Intrusion Detection: Intrusion Prevention" by Okena.

"Using Software Restriction Policies in Windows XP and Windows .NET Server to Protect Against Unauthorized Software" by John Lambert, Microsoft Corporation, Jan. 2002.

"Loadable Kernel Modules" by Keith J. Jones, *Login: The Magazine of Usenix & Sage*, vol. 26, No. 7, Nov. 2001.

"Solaris Loadable Kernel Modules: Attacking Solaris With Loadable Kernel Modules", Version 1.0, by Plasmoid, 1999.

"System Call Interception: An Entercept Security Technologies White Paper", Entercept Security Technologies, 2001.

"Entercept 2.5 User's Guide", Entercept Security Technologies, 2002.

"Using Software Restriction Policies in Window XP and Windows .NET Server to Protect Against Unauthorized Software" by John Lambert, Microsoft Corporation, Jan. 2002.

* cited by examiner

KERNEL-BASED NETWORK SECURITY INFRASTRUCTURE

PRIORITY STATEMENT UNDER 35 U.S.C. § 119 & 37 C.F.R. § 1.78

This non-provisional patent application claims priority from prior U.S. Provisional Patent Application Ser. No. 60/343,098 filed Dec. 20, 2001 in the name of Daniel M. Teal, entitled "Network Security Infrastructure."

FIELD

The disclosed invention relates generally to a kernel based network security infrastructure system. More particularly, this invention pertains to a system and method which is resident, in part, in that portion of the operating system which runs in the kernel space of each computer resource in a network and operates together with a security manager. The disclosed system and method is designed to verify the integrity of communications entering each individual computer resource in a computer network and thereby thwart unwanted or malicious intrusions into that portion of an independent operating system resident in the kernel space of each individual computer resource in a computer network. Monitoring and control of the communication verification process is accomplished by the security manager.

BACKGROUND

Many individual computer users do not understand that there may be many operations going on within their individual computer resource which affect its security. These operations are generally invisible to an unsophisticated user. This invisibility is a result of the fact that computer users typically interface only with the operating system of an individual computer resource and a small number of software applications being run by the operating system of a computer resource in that portion of the operating environment known as the user space. What happens in the other portion of the operating environment of a computer resource, called the kernel space, is generally unseen and left unexplored by those computer users without the competence or desire to explore the inner workings of their computer resource.

Most computer users are completely unaware that whatever they do in the user space enters into the generally unseen portion of the operating environment called the kernel space, even though the major portion of a computer resource's operating system resides in the kernel space. As operating systems have evolved since personal computers became generally available, the working interface actually perceived by the computer user, in the user space, and the operating system of a computer, in both the user space and in the kernel space, has become more and more friendly to the ordinary computer user. This user-friendliness is a result of increased complexity and functionality being added to that portion of the operating system resident in the kernel space.

Not only has increased complexity been added to the operating system resident in the kernel space by those software makers who make and sell computer operating systems, but in addition the wide variety of available hardware devices which can be attached to a computer system often include specialized operating software which simplifies the operation of the hardware device made available to the computer user in the user space. This specialized operating software for hardware devices is downloaded into the operating system resident in the kernel space to assure that the user's difficulty in operating the hardware device is minimized. Similarly, software applications, which are installed by a computer user using that portion of the operating system resident in user space, often include a large block of programming code which makes the software user-friendly. This large block of programming code is then added to that portion of the operating system resident in the kernel space. The danger is that, unbeknownst to the user, the simple attachment of a hardware device to a personal computer or the simple loading of a new piece of software can insert unwanted or malicious programming code into the operating system of an individual computer resource. Unless something unusual happens, the computer user will have no indication that unwanted or malicious programming code has been downloaded into his computer resource.

Consider, for example, the basic model of a single, stand alone, un-networked personal computer with a telephone connection to the internet. If the computer user manually installs a commercially available software application from a floppy disk or CD, or if the computer user downloads a software application into his personal computer from the internet, that software application may include an unwanted or malicious programming code such as a hidden reporting feature which uses the connection of the personal computer to the internet to provide the maker or vendor of the software, or even a third party, with information regarding the frequency of use of the software, information about the user of the software, or in the worst cases, the actual content of data in a secure data storage location. Such information may be sent to the maker of the piece of commercial software or a third party whenever the software is being used, or such information may be stored in the kernel space and transmitted at regular or irregular times and intervals, such as 3:00 am every Sunday morning, or only on the 30th day of months having 31 days, or whenever the user logs onto the internet. The actual transmission or the content of such reports is unseen by the computer user, as most computer users do not monitor, or for that matter, do not even know how to monitor, the information being sent out by their personal computer over the internet. The instructions to send reports back from a computer resource may originate with the vendor of the software to the user, or they may be placed on a CD by the vendor who supplied the CDs to the software application vendor. The simple fact is that the manual installation of a commercial software application as innocuous as a screen saver may significantly add to and change the operating system resident in the kernel space of a individual computer resource.

Consider now a personal computer or individual computer resource connected to a network of personal computers or individual computer resources using the internet for the purpose of sharing licensed software and proprietary data. Access to all of the internet is also provided for all individual computer resources in the network. Software, web pages, and a variety of other information may be downloaded from the internet to the individual computer resources in the network. Just like commercially available software programs that are either manually installed or downloaded from the internet add to or change the operating system resident in the kernel space of an individual computer resource, so too will computer instructions downloaded from the internet add to or change the operating system resident in the kernel space of all individual computer resources connected to the network of individual computer resources. Once again, the simple act of downloading a software application or data from the internet may inject unwanted or malicious instructions into the operating systems resident in the kernel space—which instructions are invisible to the computer user. As previously indicated, the instructions may simply be to report usage of a software application, but once entrance has been gained into that portion of the operating system resident in the kernel space, any aspect of the workings of the operating system resident in the kernel space of the individual computer resource can be added to, modified, or dramatically changed.

Those who seek to gain access to and modify the operating system of the computer resource of another form a particularly dangerous group of computer hackers. These computer hackers have discovered that once entrance has been gained into the operating system resident in the kernel space of an individual computer resource, a wide variety of other changes can be made. Such changes may actually alter the way the operating system resident in the kernel system works. Such changes may be programmed to occur immediately, or the changes may be programmed to occur after being triggered by a specific event or the occurrence of a specific point in time. Such changes to the operating system resident in the kernel space can include disabling or modifying the internal security system portion of the computer operating system or leaving a back door open into the kernel space. This open back door will permit future additions, modifications, or dramatic changes to that portion of the operating system resident in the kernel space. Such dramatic changes may include altering the way the computer processes operating instructions and/or uses data to provide results for the computer user or the basic way the computer saves, manipulates, and reports the results of standard operations involving stored data.

In most business applications, the personal computer resident at the desk of an employee is connected to a proprietary network linking the employee to the business' software and providing access to the business' proprietary data. In this proprietary network, an individual computer resource may be typically connected to a host of other personal computers resident at the desks of other employees located in a small geographical region, or in a state, or in a country, or possibly even around the world. Complex proprietary networks of individual computer resources include sub-networks built around nodes. The sub-network nodes are then interconnected to form massive computer networks available to large numbers of users.

Management of communication within large proprietary computer networks is often done by server computers located at network nodes. The simple inclusion of an individual computer resource into a proprietary computer network provides at least two more paths into the operating system resident in the kernel space of the individual computer resource. The first path is the connection to the proprietary network by which functionalities and proprietary data are shared. The second path into the kernel space of the individual computer resource is the access given to one or more network administrators to control and maintain communications among the various individual computer resources in the proprietary network of individual computer resources.

Because the individual computer resources in a proprietary computer network are continually in contact with one another and are sharing both software and proprietary data, the downloading of unwanted or malicious programming code into the operating system resident in the kernel space of one individual computer resource in a computer network can rapidly be spread to all of the computer resources in the network. It has been estimated that many of the intrusions into the operating systems resident in the kernel space of networked individual computer resources actually originate from within a proprietary computer network. Accordingly, the vulnerability of all of the individual computer resources in a proprietary network is the same as the vulnerability of the least protected individual computer resource in the proprietary computer network. And, with the increased use of network switches and the increasing speeds of communication among the individual computer resources within a proprietary computer network, the problem of protecting the operating system resident in the kernel space of the individual computer resources in a proprietary computer network becomes an increasingly difficult problem to manage for those responsible for security of a proprietary computer network.

As the problem of unwanted intrusion into the operating system resident in the kernel space of a computer is not a new one, there have been several approaches to protecting the operating system resident in the kernel space of an individual computer resource.

The use of the embedded utility of creating an audit trail for security analysis requires that all of the data collected about communication with the operating system must be written to a data storage file, then at some future time, read back into an audit trail analysis program to detect a possible security breach by looking for anomalies in the audit trail data. Of course, the larger the quantity of audit trail data, the larger the data storage file needed to hold the audit trail information.

Hackers, or those seeking to avoid detection by a security utility in an operating system which performs an audit trail analysis to detect security breaches, quickly learned that by turning off the utility in the operating system which creates an audit trail or by deceiving the analysis program which analyzes the audit trail with vast amounts of spurious data, entry could be gained into that portion of operating system resident in the kernel space. Once entry has been gained into that portion of an operating system resident in the kernel space, the hacker can manipulate the operating system to obtain administrator privileges and thereby reconfigure the existing embedded security utility. For example, a hacker with administrator privileges can corrupt the transfer of audit trail data from its storage location to the audit trail analysis program. Such corruption of the audit trail data on its transfer to an audit trail analysis program defeats the embedded security utility of an operating system. It has been found that some hackers are even able to disguise their break-ins and permanently leave a door open into the operating system for future unwanted or malicious intrusions.

Another attempt to protect the operating systems resident in the kernel space of an individual computer resource is by the use of a firewall product. Firewall products, which employ a passive filtering technique to look for data packets matching known security violations or misuse patterns, are typically placed somewhere between a managed proprietary network and an untrusted external source of information such as the Internet. Firewall products attempt to implement security on the perimeter of a proprietary computer network by monitoring all traffic or data packets traveling both to and from the proprietary computer network to determine which data packets can pass into or out of the proprietary computer network and which cannot. Some firewall products can identify suspected break-in events and issue appropriate alarms to a designated one of multiple computer resources in the computer network. Other firewall products may invoke a predetermined action to head off a suspected break-in event. Still other firewall products may trace an attempted break-in event through the creation and analysis of the data produced by an audit trail of all traffic.

A data packet-filtering firewall examines all of the data packets that are encountered, then the firewall product either allows these data packets to pass into an operating system as addressed or drops them based on a predetermined rule set. The network administrator can adjust how data packet filtering is performed by a firewall product, as far as permitting or denying connections to designated computer resources, by establishing filtering criteria in the firewall based upon the source of the data packet, the destination of the data packet, or the type of data contained in the packet.

In addition to data packet filtering, some firewall products offer other useful security features, such as the following:

Stateful packet inspection. State information is derived from past communication with the proprietary network and other software applications to make the decision to allow or deny new attempts to gain entry into a proprietary computer network. With the stateful packet inspection method of security, data packets leaving the computer resource are intercepted by an inspection engine in the firewall product that extracts state-related information. The inspection engine maintains the state-related information in dynamic state tables for evaluating subsequent attempts to gain entry into the proprietary computer network. Data packets are only permitted to pass into the proprietary computer network when the inspection engine in the firewall product examines a list of permitted communications and verifies that the attempt to gain entry into the proprietary computer network is in response to a valid request. The list of connections is maintained dynamically, so only the required ports are opened. As soon as the session is closed, the ports are locked to assure maximum security.

Network Address Translation (NAT). Network Address Translation hides the internal addresses of individual computer resources within the network from public view. This protects an individual networked computer resource from being used for spoofing (a technique for impersonating authorized users by using a valid address to gain access to a proprietary computer network).

Denial-of-service detection. Denial of service detection defends a proprietary computer network against attempts to gain access by techniques known as syn flooding, port scans, and packet injection. Specifically, data packet sequence numbers in TCP connections are inspected. If the data packet sequence numbers are not within expected ranges, the firewall drops the data packets as suspicious data packets. When the firewall product detects unusually high rates of attempted new connections, it issues an alert message so that the network administrator can take appropriate action to protect other computer resources in the proprietary network.

Code Detection. Certain controls known as Java applets and ActiveX controls can be used to hide intelligent agents that can give intruders access to the operating systems of individual computer resources once these controls get inside a proprietary network. With the increasing use of Java applets and ActiveX controls on Web sites, some firewall products offer the means to either deny computer users access to Web pages that contain these controls or to filter such content from the Web pages when these controls are encountered.

Probe detection. Some firewall products offer alarms that are activated whenever probing is detected. The alarm system can be configured to watch for TCP or UDP probes from either external or internal networks. Alarms can be configured to trigger: a) e-mail messages, b) popup windows, or c) output messages to a local printer.

Event logging. Event logging automatically logs system error messages to a console terminal or syslog server. These system event messages enable network administrators to track potential security breaches or other non-standard activities on a real-time basis.

In addition to the foregoing, some firewall products now include automated intrusion-detection tools. One example is the OmniGuard/Intruder Alert offered by AXENT Technologies. The OmniGuard/Intruder Alert includes numerous drop and detect security scenarios. The preconfigured drop and detect security scenarios enable users of proprietary networks to install an automated intrusion detection tool to instantly protect individual computer resources from the most common and dangerous security threats.

The Intruder Alert firewall product uses a real-time, manager/agent architecture to monitor the audit trails of distributed computer systems for footprints which signal suspicious or unauthorized activity on all major operating systems, Web servers, other firewalls, routers, applications, databases, and SNMP traps from other devices connected to the proprietary network of computer resources. Unlike other automated intrusion-detection tools, which typically report suspicious activity hours or even days after it occurs, the Intruder Alert product takes action as soon as a suspicious intrusion is detected to alert network administrators, shut down computer resources, terminate offending sessions, and execute commands to stop intrusions before any major damage occurs. Once an attempted intrusion has been detected, a network administrator can create and quickly implement new security policies for different domains within a proprietary network, thereby implementing additional protection for multiple computer resources. In addition, the Intruder Alert product provides the network administrator with a correlated graphical view of security trends, thereby enabling the network administrator to view and analyze real-time security trends and to drill down for additional details concerning attempts to breach the protection provided by a firewall product.

Even after a firewall network protection solution has been implemented, it is still recommended that owners of proprietary computer networks periodically conduct a comprehensive security-risk assessment. Such security risk assessments assist network administrators in identifying and resolving security breaches before such security breaches are discovered and exploited.

A number of security risk-assessment tools are available, to include a product called Hacker Shield developed and sold by BindView. The Hacker Shield product scans and detects proprietary networks for potential security holes and offers computer users patches or corrective actions to fix the breaches before they become a threat. The HackerShield product also identifies and resolves security vulnerabilities at both the operating-system level and at the network level. This product protects against both internal and external threats. The Hacker Shield product also monitors key system files for unauthorized changes and identifies vulnerable computer user passwords through a variety of password-cracking techniques.

Security risk assessment tools typically provide a detailed report of attempted break-ins and action taken to network administrators. This report describes each vulnerability of the computer network and the corrective action taken as well as a ranking of the vulnerabilities by the risk posed. Network administrators also are given a high-level overview of the vulnerability of the proprietary network and its solution, with an option to link to more detailed explanation and reference materials.

While the value of firewall products for passive monitoring and security of proprietary computer networks is undisputed, firewall products can degrade the performance of individual computer resources and create a single point of network failure. Tasks such as stateful data packet inspection, encryption, and virus scanning require significant amounts of processing capacity. As traffic in and out of a proprietary computer network increases, firewalls can become bogged down. Also, because a firewall product sits directly in the path of data packets, the firewall product itself constitutes a single point of failure. If the firewall product cannot keep up with filtering all of the data packets, the firewall product will stop passing all communications, thereby isolating the proprietary computer network behind it.

Dynamic load balancing switches are used to monitor the health of firewall products through automatic, periodic health checks. These dynamic load balancing switches also monitor the physical link status of the switch ports that are connected to each firewall product. Because the firewall products are no longer directly inline and traffic is evenly distributed among them, the end-user experience is improved. The dynamic load balancing switches automatically recognize failed firewall products and redirect entire sessions through other available firewall products.

Although the use of firewall products provides a formidable defense against many attacks on a proprietary network of computer resources, firewall products are not a panacea for all network security problems—particularly those network security problems that originate from within a proprietary computer network. For example, even if virus scanning is provided at the firewall product, such virus scanning will only protect against viruses that come into the proprietary computer network from outside the computer network—typically from the Internet. Scanning for viruses using firewall products does nothing to guard against the more likely sources of intrusion, such as floppy disks containing unwanted or malicious code that are inserted into one individual computer resource in a proprietary computer network by an authorized user who uploads a program onto a floppy disk, inserts it into an individual computer, and inadvertently (or deliberately) spreads a virus throughout the proprietary computer network.

Accordingly, there remains a need in the art for owners of proprietary networks of individual computer resources to have greater security protection than is provided by embedded security utilities, by firewall products, or by firewall products with automatic intrusion detection tools.

SUMMARY

The need for owners of proprietary computer networks to have increased security protection is addressed by the kernel-based network security infrastructure system and method of the present invention, which is described in the drawing figures and in the Description of the Embodiments which follows.

The basic purpose of a computer security system for a group of networked individual computer resources is to protect the operating systems of the individual computer resources in the network of individual computer resources from unauthorized access by unwanted or malicious programming code, whether this unwanted or malicious programming code originates from within the proprietary computer network or outside the proprietary computer network. To protect the individual computer resources, it is essential that unwanted or malicious programming code not be inserted into an operating system. Once a hacker has gained access into that portion of the operating system resident in the kernel space, the operating system assumes that the continued access to that portion of the operating system resident in the kernel space by the hacker is authorized and that the data that is generated as a result of such access is reliable. Unfortunately, the authorization for continued access to that portion of an operating system resident in the kernel space and the trust given to the generated data is often misplaced.

The kernel based network security infrastructure system and method of the present invention modifies the operating system resident in the kernel space of an individual computer resource to generate data describing communication with the operating system resident in the kernel space taken at the most effective location in the kernel space to provide a level of security above the network administrator. This level of security can even protect against unauthorized activity by those with authorized access into that portion of the operating system resident in the kernel space of an individual computer resource.

Specifically, the system and method of the present invention includes a computer code set which is loaded into the kernel space of the independent operating system of each computer resource in a network of computer resources. The computer code set enables the identification and prevention of attempts to insert unwanted or malicious computer instructions into the kernel space and/or through the kernel space into one or more user spaces from either within the network of individual computer resources or outside the network of computer resources. If allowed into the kernel space, the unwanted or malicious programming code would alter the operation of the independent operating system of each computer resource in the network of computer resources. A security manager in secure communication with the computer code set monitors the security of the operating system of each individual computer resource in the network of computer resources.

By use of the system and method of the present invention, a configurable set of events is created and action can be taken to protect that portion of the operating system resident in the kernel space of a computer resource immediately upon the detection of the presence of unwanted or malicious programming code.

Accordingly, the system and method of the present invention provides security for the individual computer resources in a computer network by intrusion prevention, intrusion detection, and intrusion alerting by placing security managers at the nodes of a computer network, assuring secure communication with the security managers, trapping calls into the operating system of an individual computer resource irrespective of source, and checking the operating system resident in the kernel space for integrity.

Further, the system and method of the present invention is designed to work with commonly available operating systems; that is, the disclosed security infrastructure is not dependent on the embedded security utility in the operating system for its functionality.

In one aspect of the present invention, a system and method for providing a security infrastructure for a network of computer resources is disclosed in which communication with that portion of the operating system resident in the kernel space is checked by a computer code set installed in the kernel space. This checking of communication by the computer code set installed in the kernel space is designed to detect and, if necessary, to prevent the entry of unwanted or malicious programming code into that portion of the operating system resident in the kernel space. The computer code set which checks for the attempted entry of unwanted or malicious programming code into the operating system is installed into the kernel space portion of the operating system in each individual computer resource in the plurality of computer resources or other hardware devices associated with a proprietary computer network. A security manager located at predetermined nodes within the computer network receives information from and governs the operation of the computer code set which checks for the attempted entry of unwanted or malicious programming code into the operating system of each individual computer resource. Thereby, each individual computer resource within the computer network may transmit information about attempts to insert unwanted or malicious programming code to any other similarly configured computer resource in the computer network to the security manager. Such security protection can occur in real time and in a secure mode, without imposing any unnecessary delays or burdens on the communication between computer resources.

Another important aspect of the kernel-based network security infrastructure system and method of the present invention is the ability to detect an intrusion into a proprietary computer network at the earliest possible time. As previously described, with the disclosed system and method of the present invention installed, the operating system resident in the kernel space of an individual computer resource traps the code for the network device drivers and thereby captures and inspects all communication between a proprietary computer network and that portion of the operating system resident in the kernel space. This trapping of the code for network device drivers together with the capturing and inspecting of all network communication allows data packets to be inspected before they actually enter the network, including such early network points as the protocol stack and the network kernel module. The benefit from trapping the code for the network device drivers and then capturing and inspecting network communication is that unwanted or malicious data packets can be filtered out before they are transmitted out onto the network. The early detection feature of the system and method of the present invention is also useful in trapping communications between the operating system resident in the kernel space and other hardware devices, such as a keyboard, a hard drive, a storage device, a mouse, or serial ports.

In another aspect of the kernel based network security infrastructure system and method of the present invention, the authenticity of user-space applications can be verified through the use of the computer code set loaded into the kernel space. This computer code set checks for the attempted entry of unwanted or malicious programming code and is loaded into, or embedded in, the kernel space. Specifically, a module including the computer code set of the present invention actually located in the kernel space traps the entries into the system call table for the purpose of intercepting all communications between applications running in the user-space and in the kernel space. By trapping the entries in the system call table, the presence of unwanted or malicious programming code can be determined.

According to the present invention, prioritized message queues are used to assure that all security manager communications messages have a higher priority than standard event logging or other types of messages.

Another feature of intercepting communications between applications resident in the software applications running in the user-space and in the kernel space portion of the operating system is the ability to authenticate communications from software applications running in the user-space before they pass into the kernel space. To authenticate the software applications running in the user space, each set of programming instructions and associated configuration data is digitally signed, and a digital hash of each signature is retained in the kernel space. Each time the software application is used, the digital hash can be checked to verify that the software application is authorized to run on the individual computer resource. If the digital hash is not authenticated, the operating system resident in the kernel space of the individual computer resource will not allow the software application to run in the user space.

Another feature of intercepting communications between the software applications being run in the user space portion of the operating system and in the kernel space is the resulting ability to process secure communications between two authenticated software applications. When a software application being run on one computer resource in the computer network communicates with a software application being run on a different computer resource in the computer network, the communication flows from the first software application, through the operating system resident in the kernel space of the first computer resource, to the operating system resident in the kernel space of the second computer resource and, then finally, to the software application being run in the user space of the second computer resource. Because the communication flow is through the operating systems resident in the kernel spaces of each computer resource and because there are no shared components of memory, sockets or transmission facilities, the communication between the software applications being run on the two separate computer resources in the computer network remains secure. This secure communication between software applications provides the user with the ability to move data files, applications, operating system patches or, in general, any type of information securely between two software applications without the risk of transmitting unwanted or malicious programming code.

Another aspect of the system and method of the present invention is the control over network administrator access to the operating system of each individual computer resource in a proprietary computer network. Typically, the network administrator is able to access all aspects of the operating system of designated individual computer resources and is able to perform all required tasks, such as the creation of user accounts and the installation and removal of software applications. According to the kernel-based network security infrastructure system and method of the present invention, high level access privileges can be loaded into that portion of the operating system resident in the kernel space so that the access privileges associated with the network administrator cannot be circumvented or abused.

Another aspect of the kernel based network security infrastructure system and method of the present invention is the ability to authenticate communications from outside the network of individual computer resources. Typically, all communication between the operating system resident in the kernel space of different individual computer resources in the network is secured using the IP Security Protocol or the Secure Socket Layer protocol. Once the communication between the operating systems resident in the kernel space of the individual computer resources in a proprietary computer network is secured through the use of such a protocol, the communication to the operating system resident in the kernel space of each individual computer resource is authenticated using public/private key certificates and standard encryption algorithms to encrypt data moving across the network of individual computer resources. In addition, communications to and from remote computer networks can be securely transmitted by moving encrypted data from the operating system resident in a secure kernel on one computer resource to the operating system resident in a secure kernel on another computer resource.

A common feature of each aspect of the kernel based network security infrastructure system and method of the present invention is the ability to secure the operating system resident in the kernel space. There are a number of methods which may be used to secure the operating system resident in the kernel space. One method is to encrypt the symbol table in the operating system resident in the kernel space. Even if a rogue module or other code portion becomes able to execute programming code inside of the operating system resident in the kernel space, that rogue module or other portion of code programming will not be able to use the symbol table to find global and local functions and variables. On many computer resource operating systems, this inability to use the symbol table to find global and local functions will prevent the operating system from locating the call table or from loading new modules. Another method of securing the operating system resident in the kernel space is to hide the directories that contain the binaries, the configuration files, and the data log files that are regularly used by the embedded security utility system portion of the operating system. Any attempt to access these directories or files by unauthenticated software applications will fail as if these directories or files did not exist at all.

Still another feature of the kernel based network security infrastructure system and method of the present invention is the ability to generate one or more configurable sets of events within the operating system resident in the kernel space. This configurable set of events is not related to or dependent in any way upon the embedded security utility or audit trail data generation system provided by the vendor of the operating system.

The security utilities embedded in the currently available prior art operating systems take the operating system audit trail and converts it into a canonical format for processing at a later time, thereby creating a significant processing burden on the individual computer resource. For example, that portion of the operating system resident in the kernel space generates an audit trail record and then copies that audit trail record to the user space audit daemon. The user space audit daemon then writes it to the file system, which in turn requires another call to the operating system resident in the kernel space. The audit trail analysis system then queries the operating system resident in the kernel space for the audit trail data record, creating yet another call to the operating system resident in the kernel space.

In the kernel based network security infrastructure system and method of the present invention, an analysis system copies a configurable set of events directly to the file system from the kernel space and then also copies the configurable set of events directly to the configurable set of events analysis application at the security manager. This independent audit feature provides the ability to create a configurable set of events analysis application for performing security and intrusion detection functions across operating system platforms offered by a wide array of different vendors.

Another aspect of the kernel based network security infrastructure system and method of the present invention is the provision of a mechanism to securely synchronize the internal clock of each individual computer resource in a proprietary computer network. By synchronizing the internal clocks through each operating system resident in the secure kernel space of each individual computer resource, the disclosed system and method provides a means for conforming the clock specifications across a proprietary computer network.

The kernel based network security infrastructure system and method of the present invention includes a computerized execution of a method for securing the individual computer resources in a proprietary computer network to include the client computers, the servers, and the computer-readable media. In addition to the aspects and advantages of the present invention described in this summary, further aspects and advantages of the invention will become apparent by reference to the drawing figures and by reading the Description of Embodiments that follows.

BRIEF DESCRIPTION OF THE DRAWING FIGURES

A still better understanding of kernel-based network security infrastructure system and method of the present invention may be obtained from reference to the drawing figures, wherein.

DESCRIPTION OF THE EMBODIMENTS

In the following description of the embodiments of the disclosed kernel based network security infrastructure system and method of the present invention, reference is made to the accompanying drawing figures, which form a part hereof, and in which is shown, by way of illustration, how the disclosed system and method of the present invention may be practiced by one of ordinary skill in the art to which they pertain.

It is to be understood that other embodiments of the system and method of the present invention may be utilized and that logical changes may be made to the disclosed system and method without departing from their spirit or scope. The following detailed description is, therefore, not to be taken in a limiting sense, and the scope of the present invention is to be defined only by reference to the appended claims.

As previously indicated, conventional security products for use with proprietary computer networks, such as firewall products and firewall products including automatic intrusion detection capabilities, typically use a passive filtering technique to detect access violations and patterns of misuse originating from outside the proprietary computer networks on which the firewall products are installed. The passive filtering technique used by firewall products is a system which monitors the traffic of data packets to and from a computer network. Typical data packet filtering techniques involve the use of a signature analysis or a pattern matching algorithm to compare the signatures of individual data packets with the signatures of those data packets including known policy violations or patterns of misuse.

Figure 1:
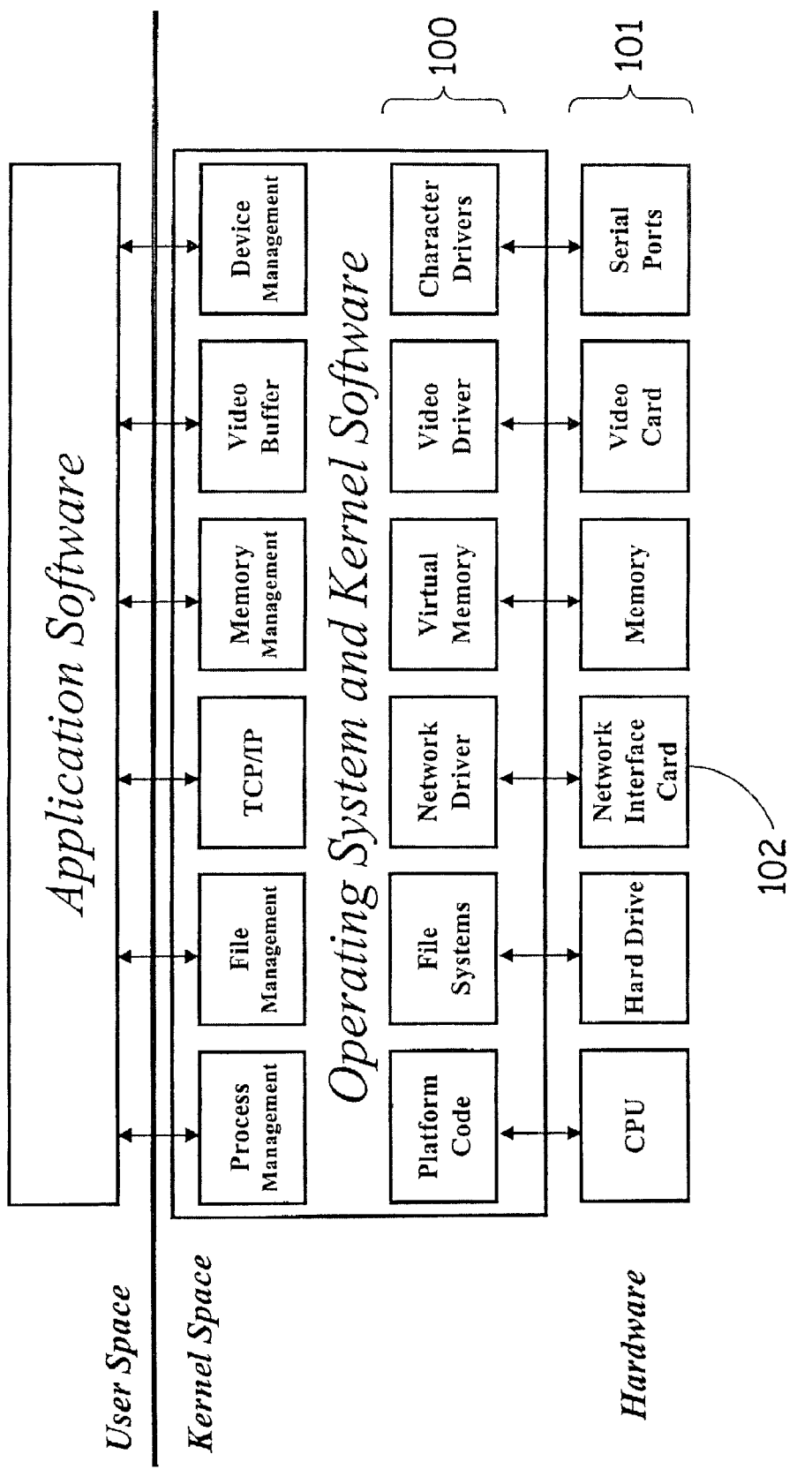
FIG. 1 is a diagram of an exemplary operating system showing its division into the user space and the kernel space.

One significant aspect of security for a proprietary computer network that is frequently overlooked is the continuing integrity of the operating system code which is resident in the kernel space of the individual computer resources in a computer network. Shown in FIG. 1 is a schematic diagram of the portion of an operating system code resident in the kernel space which manages the operation of an individual computer resource. Note that the management of an individual computer resource is accomplished by separating the software that manages the computer hardware 101 from the other programs and providing services for these other programs. Specifically, a portion of the operating system code 100 resident in the kernel space manages the CPU memory, the hard drives, the network interface cards, the serial ports, and any other hardware used with an individual computer resource. The services provided by the operating system are made available to software application programs running in the user space through a system call interface. Those operating system services made available to software application programs running in the user space through the system call interface include file management, process creation, and network communication.

Many commonly available computer operating systems like Solaris, Windows 2000, and Linux utilize loadable kernel modules. These loadable kernel modules permit the easy installation and removal of operating system capabilities. For example, the Windows 2000 operating system, sold by Microsoft, installs a new device driver when a new network interface card 102 is plugged into a PCI hot-plug slot. The Windows 2000 interface card an be physically installed, configured, and used without powering off the computer hardware or rebooting the operating system.

All information about processes and user credentials is stored in data structures within an address memory in that portion of the operating system resident in the kernel space. There is no delineation between privileged and non-privileged users in the kernel space. Every address memory, data structure, and file within the individual computer resource is accessible to that portion of the operating system resident in the kernel space.

Loadable kernel modules which enhance operating system capabilities have full access to every computer resource in a network of computer resources by virtue of the connections between the individual computer resources in the network. If the goal is to disrupt or modify the operation of an operating system, it is possible to use a loadable kernel module including unwanted or malicious intrusions into the operating system resident in the kernel space. This loadable kernel module can be made to bypass all security checks. Operating system code which runs in the kernel space will not show up in the process table portion of an operating system. Such operating system code can modify data packets being received or sent through the network interface card (NIC) 102, can modify files on the file system without being audited, and can even disable security features, such as an audit trail analysis, which are typically built into the commonly available operating systems.

The problem with most network security products and applications is that the design of these products is based on the assumption that the operating system code resident in the kernel space of an individual computer resource is reliable. A security application software program that verifies the integrity of a file on the file system must first ask the operating system code resident in the kernel space to open an audit trail, read the audit trail, and then copy the contents of the audit trail file into the address space of the security application software application, and finally, close the audit trail file. The network security application relies on the operating system code resident in the kernel space to open the right audit trail file. However, if unwanted or malicious programming code has entered the operating system, this reliance may be misplaced when access to the right audit file is blocked, or the audit trail file has been corrupted.

System Architecture

Figure 2:
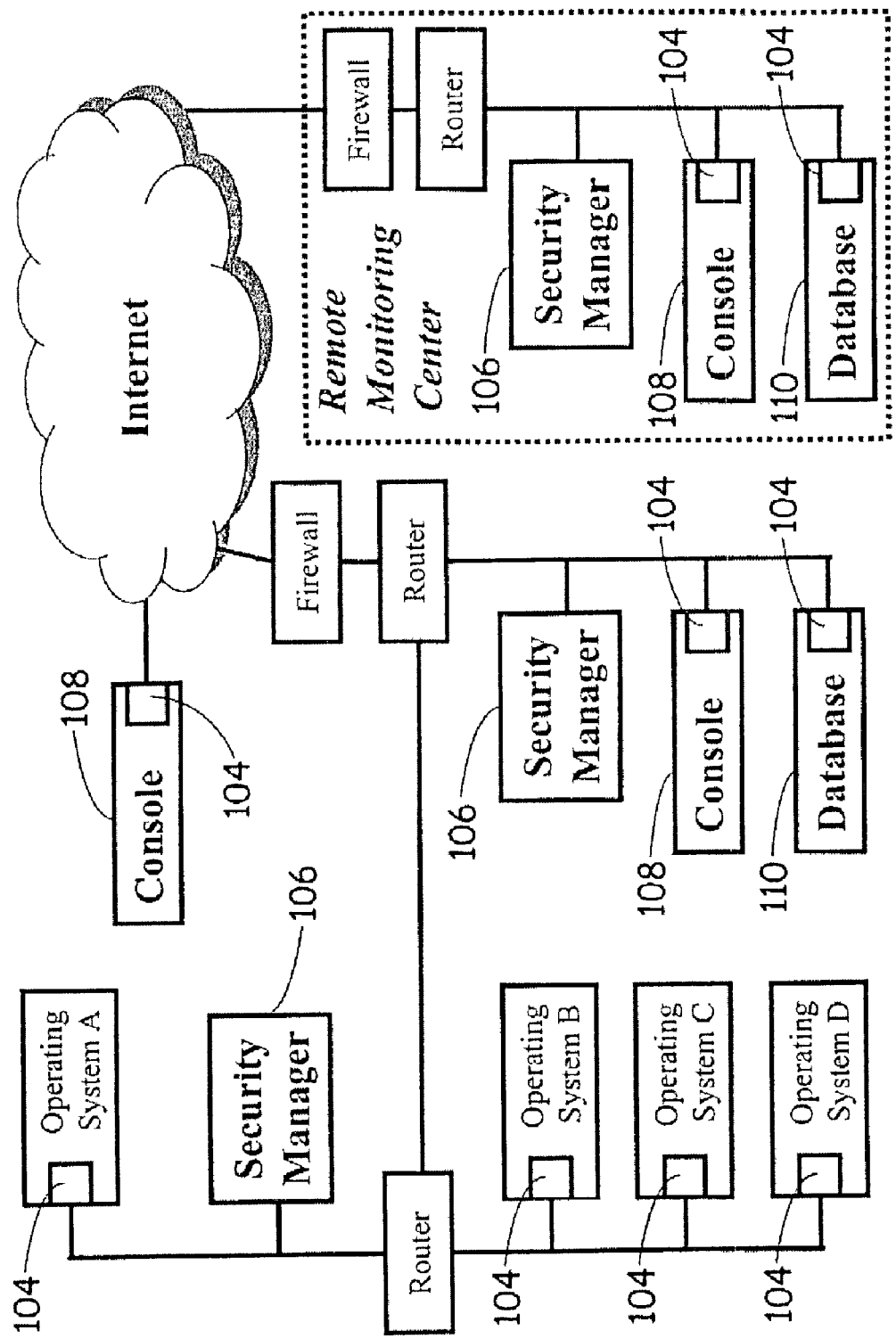
FIG. 2 is a schematic diagram of the disclosed kernel-based network security infrastructure system installed on a proprietary network.

The architecture of the disclosed kernel based network security infrastructure system and method is shown by reference to FIG. 2. On the left side of FIG. 2 are shown a variety of different operating systems such as Windows 2000, Solaris, etc., each of which operating systems may be resident on individual computer resources in a proprietary computer network. A computer code set 104 located in the kernel space is positioned to capture all calls into that portion of the operating system resident in the kernel space before these calls hit the application program interface (API) or before they hit the network interface card (NIC). Specifically, any calls from hardware, software application programs running in the user space, or from the internet are checked. The key to this aspect of the kernel based network security infrastructure system and method of the present invention is that all paths into the operating system resident in the kernel space are monitored. System calls are trapped and data is generated on at least process identification, user identification, and call age for each call. This data is stored in a buffer in the memory portion of the operating system resident in the kernel space. No one, not even a user with the privileges of a network administrator, can turn off or modify the network security infrastructure system of the present invention. Therefore, this trapping of system call data is invisible to network administrators. Only those with special authorization at the security manager can ever gain access to the disclosed network security system. By being the first on any path into the operating system resident in the kernel space of any individual computer resource in a computer network, attempts to insert unwanted or malicious programming code into the operating system resident in the kernel space of an individual computer resource can be thwarted. After each call, the operating system resident in the kernel space may be checked to assure that no changes have been made.

Security Manager

Connected to each computer resource is a security manager 106 which acts as a discrete server in the computer network solely for the purpose of providing network security. If a call or input to an individual computer resource in a computer network includes an attempt to modify the operating system resident in the kernel space, the information describing that occurrence which is resident in the buffer portion of the memory in the operating system resident in the kernel portion of an individual computer resource is reported to the security manager 106. The security manager 106 distributes that information to that portion of the kernel-based computer network security infrastructure resident in the operating systems of the other individual computer resources in the computer network. Specifically, if an attempted intrusion is detected, the security manager 106 alarms all the individual computer resources in the computer network. If necessary, the security manager will modify the way all computer resources in the network check incoming calls. To assure that this exchange of information is not corrupted, all communication between the individual computer resources and the security manager server 106 is done in a secure mode.

Computer Code Set

Returning to FIG. 2, it may be seen that the entry into each operating system is guarded by the computer code set 104 of the present invention which is resident in the kernel space of each individual computer resource in a computer network. Operation of the computer code set of the present invention resident in the kernel space of each computer resource is managed by a security manager 106. A similar arrangement is also shown in the middle of FIG. 2 where both the console 108 and any database 110 being used in the user space is also protected by a portion of the computer code set 104 of the present invention which may also be governed by a security manager 106. As shown in the right side of FIG. 2, a proprietary network security manager 106 may also monitor and control what is happening in the network from a Remote Monitoring Center. The security manager 106 may define different security policies for different groupings of individual computer resources in the proprietary computer network. Further sub-groupings can define security policies for sub-groups within each grouping.

According to the disclosed invention, unwanted intrusions into a proprietary network are detected and prevented. An alert, warning a security manager 106 of an attempt at intrusion is also provided. Each individual computer resource is protected by the computer code set 104 portion of the invention located in the kernel space of each individual computer resource. The security manager 106 is used to send instructions and security updates to the computer code set 104 in each individual computer resource. Security for the entire proprietary network can be managed at the Remote Monitoring Center. Thus, each individual computer resource in the proprietary network can be protected irrespective of the operating system being used on the individual computer resource.

Figure 3:
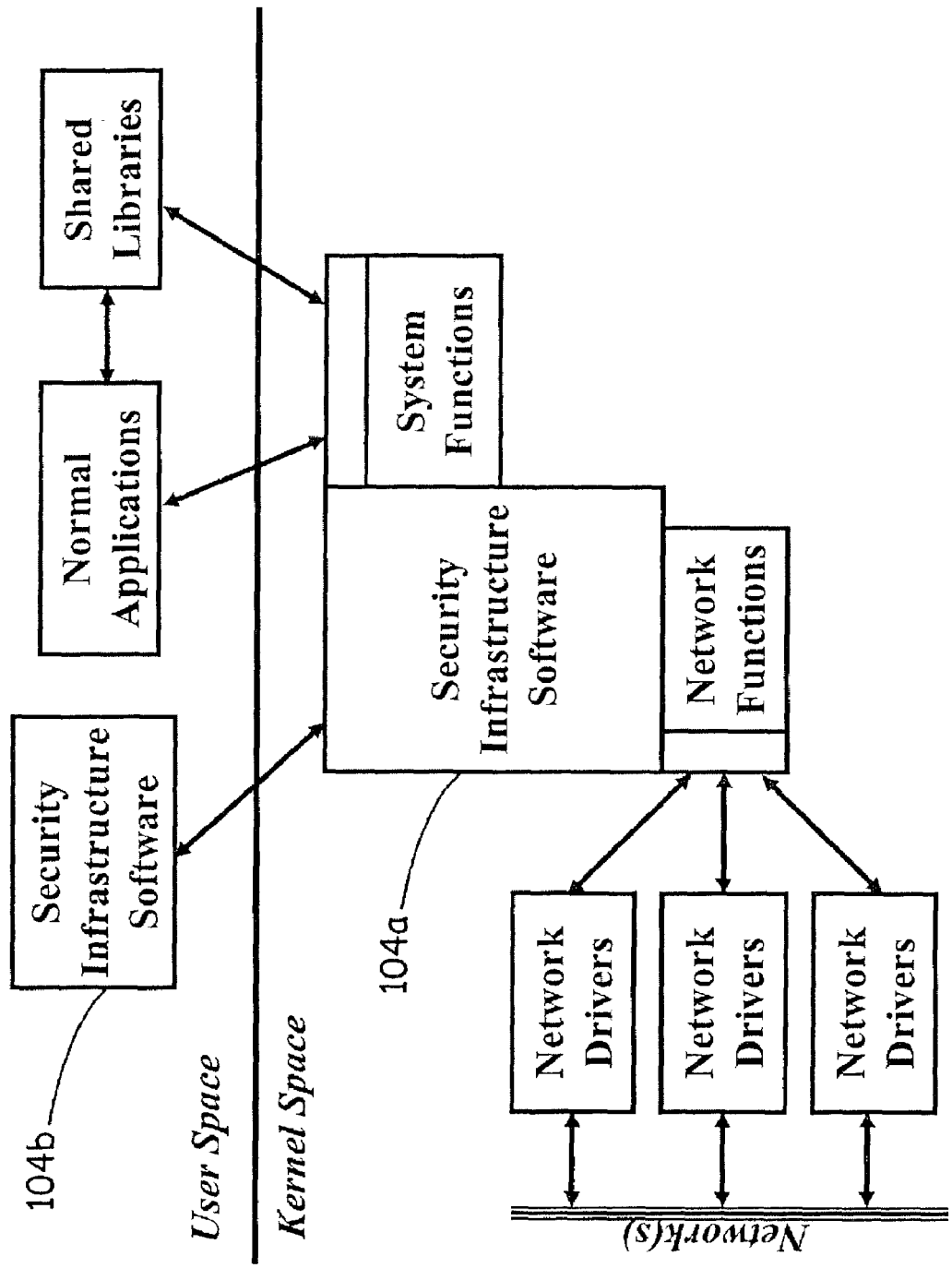
FIG. 3 is a schematic diagram illustrating the architecture of the protection provided by the disclosed system and method at an individual computer resource.

As previously indicated and as shown in FIG. 3, the system and method of the present invention includes a computer code portion set 104*b* which operates in the user space and computer code set portion 104*a* which operates in the kernel space of each computer resource. That portion of the operating system resident in the kernel space is secured from within the kernel space. And to assure security, all communication between the computer code set in the operating system of each computer resource and the security managers 106 shown in FIG. 2 is encrypted.

Trapping of Entries into the Call Table

The kernel based network security infrastructure system and method of the present invention captures entries in the call table in the operating system at each individual computer resource, thereby intercepting communications between applications running in the user space and the operating system resident in the kernel space.

Installation

The computer code set 104 of the disclosed kernel based network security infrastructure system and method is installed on an operating individual computer resource. There is no need to shut down each individual computer resource on a proprietary computer network and re-boot the operating system. Each security manager 106 may be placed at a node in the proprietary computer network where the computer code set 104 will self install as needed at each individual computer resource emanating from the node. Specifically, the computer code set 104 will be loaded into the operating system resident in the kernel portion. Once loaded, the computer code set 104 will detect and prevent attempts to load an unwanted or malicious utility into the operating system resident in the kernel space of an individual computer resource. Once such attempt is detected, an alarm will be provided to each security manager 106 and then the attempt will be analyzed to improve the ability of the proprietary computer network to protect itself from similar attempts at intrusion at other locations.

Once installed, the disclosed computer code set 104 installed in that portion of the operating system resident in the kernel space maintains continuous communication with the security manager 106 to pass along alerts about intrusion attempts and to forward information about attempted intrusions on an individual computer resource back to the security manager 106. The security manager 106, once having received information concerning an attempted intrusion, may reconfigure a policy implemented by a pre-existing firewall implemented within the proprietary network to stop future attempted intrusion from outside the proprietary network.

Capture and Inspection Function

As may be seen by further reference to FIG. 3, all communication from the user space into the kernel space is trapped and analyzed first by the computer code set 104*a* provided by the disclosed invention. This allows data packets, either from within the proprietary network or from outside the proprietary network, to be inspected before being sent to any protocol stack, kernel module, etc. Thus, data packets can be filtered out and removed before being transmitted to or received from other computer resources on the proprietary computer network. Similarly, all communications from network device drivers into the kernel space are captured and inspected first by the kernel-based network security infrastructure system and method provided by the disclosed invention. The disclosed kernel-based network security infrastructure system and method also traps communication between the operating system resident in the kernel space and other computer associated hardware device used with the computer resource in the network such as a keyboard, a mouse, a hard drive, a storage device, or through a serial port.

Digital Signing of Programming Instructions and Associated Configuration Data

Further, the security protection system of the present invention authenticates all software applications running in the user space of a computer resource. This authentication of all programming instructions and associated configuration data running in user space is accomplished through the use of a digital signing procedure well known to those of ordinary skill in the art. The digital signing process keeps track of a digital hash of the programming instructions and associated configuration data operating in the user space. If the digital signature/digital hash of the programming instructions and associated configuration data does not check out properly, the software application will not be allowed to operate in the user space. When there is a cryptologic hash, public/private key certificate technology may be used. Specifically, when a cryptologic hash is created for an application, it may be signed with a private key. If it was signed with a private key, then the code on the system uses the public key to decrypt the encrypted hash.

Network Administration Protection

Because network administrators provide a path for unauthorized intrusion into the operating system resident in the kernel space of an individual computer resource, the disclosed kernel based computer security network infrastructure may identify, limit, or even block the ability of one or more network administrators from access to the operating system resident in the kernel space.

Internal Clock Synchronization

To facilitate continued operations, the disclosed kernel based network security infrastructure system and method has the ability to synchronize the internal clock, in a secure manner, of all the individual computer resources in a proprietary computer network.

Interprocess Communication

Because all communications from applications operating in the user space to the operating system resident in the kernel space are authenticated, the interprocess communication between two authenticated software applications is secure because such communication moves through the operating system resident in the kernel space of each computer resource, which computer resource has been protected by the system and method of the present invention. No shared memory, sockets, pipes, etc., are used.

The computer code set of the present invention routes communication between a first application in the user space of a first computer resource and a second application in the user space of a second computer resource through the kernel space of the computer resources.

Encryption

All communication between the operating systems resident in the kernel space of different computer resources in the proprietary network and the security managers are secured using kernel space encryption and authentication technology; for example, by the use of IPSEC and SSL technology. The operating system resident in each kernel space of each individual computer resource in the proprietary computer network is authenticated using a public/private key certificate system which is well known to those of ordinary skill in the art. Standard encryption algorithms are used for data which is moving across the proprietary computer network.

Symbol Table Encryption

One method that the system and method of the present invention uses to secure the operating system resident in the kernel space is to encrypt the symbol table in the operating system resident in the kernel space. Thereby, if an unauthorized intrusion does make it into the operating system resident in the kernel space, it will not be able to use the symbol table to find global and local functions and variables. On many individual computer resources, encrypting the symbol table will block the operating system's ability to find the system call table or to load new modules into the operating system located in the kernel space.

Hiding and/or Restricting Access to Directories and Files

Yet another method the security protection system and method of the present invention uses is to hide and/or restrict directories that contain the binaries, configuration files, data log files, etc. that are used by the security system which is part of the operating system resident in the kernel space of a computer system. Accordingly, any attempt to access the binaries, configuration files, data log files, etc. will fail by unauthenticated applications operating in the user space as if the binaries, configuration files, data log files, etc. did not exist.

The system and method of the present invention also provides the ability to hide and/or restrict selected kernel space information from other users and other software applications running in the user space of other individual computer resources in the proprietary computer network. This feature creates the ability to hide security software applications running in the user space of an individual computer resource. In addition, the computer code set provides the ability to hide and/or restrict information contained in one set of computer instructions in kernel space from at least one other set of computer instructions.

The computer code set protects the operating system in kernel space by preventing the operating system from locating one or more operating system call tables or portions thereof by encrypting one or more symbol tables or portions thereof in the operating system code resident in the kernel space. Further, the computer code set will prevent the operating system code resident in the kernel space from loading new sets of unwanted or malicious instructions.

Prioritized Message Queues

All messages moving between software applications operating in the user space of an individual computer resource use prioritized message queues to assure that secure security manager communications have a higher priority than standard event logging or other types of online messages. The movement of messages between software applications running in the user space of different computer resources in the proprietary computer network provides the ability to move data files, applications, operating system patches, or any other type of information securely between two individual computer resources in the network.

Configurable Set of Events

The computer code portion of the present invention resident in the kernel space generates one or more configurable sets of security and intrusion management events. This separate configurable set of events is not related to the audit trail which is generated as part of the embedded security utility provided by the vendor of the operating system. The generation of a separate configurable set of events by the kernel based network security infrastructure system and method of the present invention allows for the creation of an analysis system for performing security and intrusion detection functions on a wide variety of different operating systems. Security and intrusion management events may be acquired from multiple individual computer resources to provide infrastructure-wide security and intrusion management functions.

Prior art security systems use the audit trail generation utility which is part of the operating system to convert that audit trail data into a canonical format for processing. Such methodology requires that the operating system generated audit trail record be copied into the audit daemon running in the user space, which then requires further communication with the operating system resident in the kernel space to ask the operating system in the kernel space for the audit trail record.

According to the system and method of the present invention, the separate configurable set of events is copied directly to the file system in the user space of the individual computer resource from the kernel space and is also copied directly to the system for analyzing the configurable set of events operating in the user space of the computer resource.

While the network shown in FIG. 2 is a hardwired network, it will be understood by those of ordinary skill in the art that any form of communication, such as wireless, may also be used.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, those of ordinary skill in the art will appreciate that various combination of the exemplary embodiments are applicable to solve network security problems depending on the exact computing environment. Furthermore, those of ordinary skill in the art will recognize that the invention can be practiced on a large scale although referred to herein only on a single computer or system.

The terminology used in this application is meant to include all hardware and software configuration and all networked environments. Therefore, it is manifestly intended that this invention be limited only by the following claims and equivalents thereof.

What is claimed is:

1. A security infrastructure for a network of a plurality of individual computer resources wherein each individual computer resource in the network of individual computer resources has an independent operating system which includes a portion of the operating system for supporting applications running in the user space of the independent operating system and a portion of the operating system, which is invisible to the user, for operating the individual computer resource and is resident in the kernel space of the independent operating system, said plurality of individual computer resources comprising a CPU, a memory, and a network interface card, said security infrastructure comprising:

a computer code set constructed and arranged for loading into the kernel space of the independent operating system of each of said plurality of computer resources in the network of computer resources in the network of computer resources;

said computer code set including means for identifying and preventing attempts to insert computer instructions into the kernel space and/or through the kernel space into one or more user spaces from either within or without the network of individual computer resources which computer instructions would alter the operation of the independent operating system of each computer resource in the network of computer resources;

a security manager, which acts as a server in said computer network;

said security manager including said computer code set loaded into the kernel space of the independent operating system of said security manager;

said computer code set adapted to enable secure kernel-to-kernel communication over the network with and for monitoring the security of said computer code set constructed and arranged for loading into the kernel space of the operating system of each of said plurality of individual computer resources;

wherein the kernel space of the independent operating system of each of the plurality of individual computer resources and the kernel space of the independent operating system of the security manager are secured by the security infrastructure;

wherein said computer code set further includes means to authenticate communications from the application in the user space to said computer code resident in the kernel space;

wherein said computer code set further includes means to assure that communications between a first authenticated application resident within the user space are secure as said communications move through the kernel space to a second authenticated application; and wherein said computer code set prevents the operating system code resident in the kernel space from locating one or more operating system call tables or portions thereof by encrypting one or more symbol tables or portions thereof in the operating system code resident in the kernel space.

2. The security infrastructure as defined in claim 1 wherein said computer code set is further constructed and arranged to trap entries in the call table of the independent operating system for intercepting communication between the operating system code resident in the user space and the operating system code resident in the kernel space.

3. The security infrastructure as defined in claim 1 wherein said computer code set is further constructed and arranged to cause the network device drivers in a computer resource to capture and inspect communication to and from the operating system code resident in the kernel space to other computer associated hardware used with the computer resources in the network.

4. The security infrastructure as defined in claim 3 wherein unwanted communications can be taken out before being transmitted to or received from other computer resources in the network.

5. The security infrastructure as defined in claim 2 wherein said computer code set traps communication between the operating system code resident in the kernel space and other computer associated hardware used with the computer resources in the network.

6. The security infrastructure as defined in claim 1 wherein said computer code set further includes means for authenticating programming instructions and associated configuration data in the application to be used by the operating system code resident in the user space before the application is allowed to run in the user space or in the kernel space.

7. The security infrastructure as defined in claim 6 wherein said means for authenticating programming instructions and associated configuration data includes digital signing of said programming instructions and associated configuration data.

8. The security infrastructure as defined in claim 6 wherein said means for authenticating programming instructions and associated configuration data includes keeping track of a cryptographic digital hash on each of said programming instructions and associated configuration data.

9. The security infrastructure as defined in claim 1 wherein said computer code set further includes means for identifying and limiting the access of one or more predetermined administrators to the operating system code resident in the kernel space.

10. The security infrastructure as defined in claim 1 wherein said computer code set further includes means for synchronizing the internal clock of each computer resource in the network of computer resources in a secure manner.

11. The security infrastructure as defined in claim 1 wherein said computer code set includes means to route communication between a first application in the user space of a first computer resource and a second application in the user space of a second computer resource through the kernel spaces of the computer resources.

12. The security infrastructure as defined in claim 1 wherein said computer code set includes means for securing communication with said computer code set resident in the kernel space of computer resources using kernel space encryption and authentication technology.

13. The security infrastructure as defined in claim 1 wherein said computer code set further includes means for securing communication between the operating system code resident in the kernel space and the independent operating systems of the computer resources in the network of computer resources by authentication of said communication using public private key certificates and standard encryption algorithms for encrypting data communicated between the computer code in the kernel space and the independent operating systems in the individual computer resources in the network of individual computer resources.

14. The security infrastructure as defined in claim 1 wherein said computer code set further includes means for preventing the operating system code resident in the kernel space from locating one or more operating system call tables or portions thereof.

15. The security infrastructure as defined in claim 1 wherein said computer code set further includes means for preventing the operating system code resident in the kernel space from loading new sets of computer instructions.

16. The security infrastructure as defined in claim 11 wherein said computer code set prevents the operating system code resident in the kernel space from loading new sets of computer instructions by encrypting one or more symbol tables or portions thereof in the operating system code resident in the kernel space.

17. The security infrastructure as defined in claim 1 wherein said computer code set further includes means for hiding and/or restricting directories and files.

18. The security infrastructure as defined in claim 1 wherein said computer code set further includes means for hiding and/or restricting selected kernel space information from user space.

19. The security infrastructure as defined in claim 1 wherein said computer code set further includes means for hiding and/or restricting information contained in one set of computer instructions in kernel space from at least one other set of computer instructions.

20. The security infrastructure as defined in claim 1 wherein said computer code set further includes means for assuring that all secure security manager communications between applications in the user space use prioritized message queues.

21. The security infrastructure as defined in claim 20 wherein said prioritized message queues assure that all secure security manager communications messages within said communications between applications in the user space have a higher priority than other messages.

22. The security infrastructure as defined in claim 1 wherein said computer code set further includes means for moving files in a secure fashion between computer resources in the network.

23. The security infrastructure as defined in claim 1 wherein said computer code set further includes a method for generating one or more configurable sets of events, to include security and intrusion management events for each computer resource in the network of computer resources.

24. The security infrastructure as defined in claim 23 wherein said method for generating one or more configurable sets of events copies said configurable sets of events directly to one or more applications resident in user space, said analysis system queries said computer code set resident in the kernel space.

25. The security infrastructure as defined in claim 24 wherein said one or more configurable sets of events is copied directly to one or more files from said computer code resident in the kernel space.

26. The security infrastructure as defined in claim 23 wherein said method for generating one or more configurable sets of events aggregates the events from multiple individual computer resources in the network of individual computer resources to provide security infrastructure wide functions, to include security and intrusion management.

27. An individual computer resource constructed and arranged for inclusion in a network of individual computer resources, which network includes at least one network security manager, said individual computer resource comprising:
a CPU;
a memory;
a network interface card;
an independent operating system which includes a user space and a kernel space;
said independent operating system further including a portion for supporting applications running in said user space, and a portion, invisible to the user, for operating the computer resource resident in said kernel space;
a security infrastructure including a computer code set constructed and arranged for loading into said kernel space of said operating system;
said computer code set further including means for identifying and preventing attempts to insert computer instructions into said kernel space and/or through said kernel space into said user space from either within or without the network of individual computer resources which would alter the operation of said independent operating system of the individual computer resource;
means for secure kernel-to-kernel communication over the network between said computer code set inside the kernel space of the independent operating system of the individual computer resource and a kernel space of an independent operating system of the at least one network security manager;
wherein the kernel space of the independent operating system of the individual computer resource and the kernel space of the independent operating system of the network security manager are secured by the security infrastructure;
wherein said computer code set further includes means to authenticate communications from the application in the user space to said computer code set resident in the kernel space;
wherein said computer code set further includes means to assure that communications between a first authenticated application resident within the user space are secure as said communications move through the kernel space to a second authenticated application; and
wherein said computer code set prevents the operating system code resident in the kernel space from locating one or more operating system call tables or portions thereof by encrypting one or more symbol tables or portions thereof in the operating system code resident in the kernel space.

28. A network of individual computer resources, said network of individual computer resources including a plurality of individual computer resources and at least one network security manager, wherein each individual computer resource in the network comprises:
a CPU;
a memory;
a network interface card;
an independent operating system which includes a user space and a kernel space;
said independent operating system further including a portion for supporting applications running in said user space and a portion, invisible to the user, for operating the computer resource resident in the kernel space;
a security infrastructure including a computer code set constructed and arranged for loading into said kernel space of said independent operating system;
said computer code set including means for identifying and preventing attempts to insert computer instructions into said kernel space and/or through said kernel space into said user space from either within or without the network of individual computer resources which would alter the operation of the independent operating system of each individual computer resource in the network of individual computer resources;
means for secure kernel to kernel communication over the network between said computer code set inside the kernel space of the independent operating system of the individual computer resource and a kernel space of an independent operating system of the at least one network security manager;
wherein the kernel space of the independent operating system of the individual computer resource and the kernel space of the independent operating system of the network security manager are secured by the security infrastructure;
wherein said computer code set further includes means to authenticate communications from the application in the user space to said computer code set resident in the kernel space;
wherein said computer code set further includes means to assure that communications between a first authenticated application resident within the user space are secure as said communications move through the kernel space to a second authenticated application; and
wherein said computer code set prevents the operating system code resident in the kernel space from locating one or more operating system call tables or portions thereof by encrypting one or more symbol tables or portions thereof in the operating system code resident in the kernel space.

29. A method for adding a security infrastructure to a network of individual computer resources wherein each individual computer resource in the network of individual computer resources has an independent operating system which includes a portion of the operating system for supporting applications running in the user space of the independent operating system and a portion of the operating system code, which is invisible to the user, for operating the individual computer resource and is resident in the kernel space of the independent operating system, said method for adding a security infrastructure to a network of individual computer resources comprising the steps of:

loading a computer code set into the kernel space of the independent operating system of each computer resource in the network of computers, said computer code set including means for identifying and preventing attempts to insert computer instructions into the kernel space and/or through the kernel space into one or more user spaces from either within or without the network of individual computer resources which would alter the operation of the operating system of each computer resource in the network of individual computer resources;

monitoring the security of the operating systems of the individual computer resources in the network of computer resources by secure kernel to kernel communications over the network between said computer code set inside the kernel space of the independent operating system of each computer resource in the network of computers and a kernel space of an independent operating system of a security manager; and wherein the kernel space of the independent operating system of each computer resource in the network of computers and the kernel space of the independent operating system of the security manager are secured by the security infrastructure;

wherein said computer code set further includes means to authenticate communications from the application in the user space to the operating system code set resident in the kernel space;

wherein said computer code set further includes means to assure that communications between a first authenticated application resident within the user space are secure as said communications move through the kernel space to a second authenticated application; and wherein said computer code set prevents the operating system code resident in the kernel space from locating one or more operating system call tables or portions thereof by encrypting one or more symbol tables or portions thereof in the operating system code resident in the kernel space.

30. The method as defined in claim 29 wherein said computer code set is further constructed and arranged to trap entries in the call table of the independent operating system for intercepting communication between the operating system code set resident in the user space and the operating system code resident in the kernel space.

31. The method as defined in claim 29 wherein said computer code set is further constructed and arranged to cause the network device drivers in a computer resource to capture and inspect all communication from the operating system code resident in the kernel space to other computer associated hardware used with the individual computer resources in the network.

32. The method as defined in claim 31 wherein unwanted communications can be taken out before being transmitted to or received from other computer resources in the network.

33. The method as defined in claim 30 wherein said computer code set traps communication between the operating system code resident in the kernel space and any other computer associated hardware used with the computer resources in the network.

34. The method as defined in claim 29 wherein said computer code set further includes means for authenticating programming instructions and associated configuration data in the application to be used by the operating system code resident in the user space before the application is allowed to run in the user space or in the kernel space.

35. The method as defined in claim 34 wherein said means for authenticating programming instructions and associated configuration data includes digital signing of said programming instructions and associated configuration data.

36. The method as defined in claim 34 wherein said means for authenticating programming instructions and associated configuration data includes keeping track of a cryptographic digital hash on each of said programming instructions and associated configuration data.

37. The method as defined in claim 29 wherein said computer code set further includes means for identifying and limiting the access of one or more predetermined network administrators to the operating system code resident in the kernel space.

38. The method as defined in claim 29 wherein said computer code set further includes means for synchronizing the internal clock of each computer resource in the network of computer resources in a secure manner.

39. The method as defined in claim 29 wherein said computer code set includes means to route communication between a first application in the user space of a first computer resource and a second application in the user space of a second computer resource through the kernel spaces of the computer resources.

40. The method as defined in claim 29 wherein said computer code set includes means for securing communication with said computer code set resident in the kernel space of computer resources using kernel space encryption and authentication technology.

41. The method as defined in claim 29 wherein said computer code set further includes means for securing communication between the operating system code resident in the kernel space and the independent operating systems of the computer resources in the network of computer resources by authentication of said communication using public private key certificates and standard encryption algorithms for encrypting data communicated between the computer code in the kernel space and the independent operating systems in the individual computer resources in the network of individual computer resources.

42. The method as defined in claim 29 wherein said computer code set further includes means for preventing the operating system code resident in the kernel space from locating one or more operating system call tables or portions thereof.

43. The method as defined in claim 29 wherein said computer code set further includes means for preventing the operating system code resident in the kernel space from loading new sets of computer instructions.

44. The method as defined in claim 39 wherein said computer code set prevents the operating system code resident in the kernel space from loading new sets of computer instructions by encrypting one or more symbol tables or portions thereof in the operating system code resident in the kernel space.

45. The method as defined in claim 29 wherein said computer code set further includes means for hiding and/or restricting directories and files.

46. The method as defined in claim 29 wherein said computer code set further includes means for hiding and/or restricting selected kernel space information from user space.

47. The method as defined in claim 29 wherein said computer code set further includes means for hiding and/or restricting information contained in one set of computer instructions in kernel space from at least one other set of computer instructions.

48. The method as defined in claim 47 wherein said computer code set further includes means for assuring that all secure security manager communications between applications in the user space use prioritized message queues.

49. The method as defined in claim 47 wherein said prioritized message queues assure that all secure security manager communications messages within said communications between applications in the user space have a higher priority than other messages.

50. The method as defined in claim 29 wherein said computer code set further includes means for moving files in a secure fashion between computer resources in the network.

51. The method as defined in claim 29 wherein said computer code set further includes a method for generating one or more configurable sets of events, to include security and intrusion management events for each computer resource in the network of computer resources.

52. The method as defined in claim 51 wherein said method for generating one or more configurable sets of events copies said configurable sets of events directly to one or more applications resident in user space, said analysis system queries said computer code set resident in the kernel space.

53. The method as defined in claim 52 wherein said one or more configurable sets of events is copied directly to one or more files from said computer code resident in the kernel space.

54. The method as defined in claim 51 wherein said method for generating one or more configurable sets of events aggregates the events from multiple individual computer resources in the network of individual computer resources to provide security infrastructure wide functions, to include security and intrusion management.

\* \* \* \* \*